(12) United States Patent
Bonnaud et al.

(10) Patent No.: US 8,146,868 B2
(45) Date of Patent: Apr. 3, 2012

(54) PYLON FOR SUSPENDING A TURBOENGINE

(75) Inventors: Cyril Bonnaud, Toulouse (FR); Florent Laporte, Toulouse (FR); Stéve Bedoin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 452 days.

(21) Appl. No.: 12/426,805

(22) Filed: Apr. 20, 2009

(65) Prior Publication Data

US 2009/0261198 A1    Oct. 22, 2009

(30) Foreign Application Priority Data

Apr. 21, 2008    (FR) ...................................... 08 02211

(51) Int. Cl.
*B64C 3/00*    (2006.01)
(52) U.S. Cl. ...................................................... 244/198
(58) Field of Classification Search .................. 244/198, 244/199, 54–56, 34 R, 35 R, 204, 204.1, 244/206, 211, 213–217
See application file for complete search history.

(56) References Cited

U.S. PATENT DOCUMENTS

| | | | | |
|---|---|---|---|---|
| 3,974,986 A * | 8/1976 | Johnstone | .................... | 244/199.3 |
| 4,460,138 A * | 7/1984 | Sankrithi | ....................... | 244/215 |
| 4,542,868 A * | 9/1985 | Boyd | ............................. | 244/198 |
| 4,995,575 A * | 2/1991 | Stephenson | .................... | 244/216 |
| 5,058,837 A * | 10/1991 | Wheeler | ..................... | 244/200.1 |
| 5,088,665 A * | 2/1992 | Vijgen et al. | ................... | 244/200 |
| 5,178,348 A * | 1/1993 | Bliesner | ......................... | 244/212 |
| 6,079,672 A * | 6/2000 | Lam et al. | ...................... | 244/217 |
| 6,109,567 A * | 8/2000 | Munoz Saiz | .................. | 244/215 |
| 6,491,260 B2 * | 12/2002 | Borchers et al. | ............ | 244/199.1 |
| 6,698,688 B1 * | 3/2004 | Jones | ............................ | 244/99.3 |
| 7,510,151 B2 * | 3/2009 | Perez-Sanchez | .............. | 244/213 |
| 7,866,608 B2 * | 1/2011 | Atinault | ...................... | 244/199.1 |
| 2001/0032907 A1 | 10/2001 | Borchers | | |
| 2008/0067292 A1 | 3/2008 | Bonnaud | | |

FOREIGN PATENT DOCUMENTS

| | | |
|---|---|---|
| EP | 1 149 761 | 10/2001 |
| EP | 1 527 992 | 5/2005 |
| FR | 2 905 930 | 3/2008 |
| GB | 1 212 705 | 11/1970 |
| GB | 2 112 077 | 7/1983 |

OTHER PUBLICATIONS

Preliminary Search Report dated Dec. 3, 2008 w/ English translation.

* cited by examiner

*Primary Examiner* — Richard Price, Jr.
(74) *Attorney, Agent, or Firm* — Dickinson Wright PLLC

(57) ABSTRACT

Disclosed is a mast for the suspension of a bypass turbine engine beneath a wing of an aircraft in which the wing has at least one flap. The mast includes a rear fairing that protrudes rearward of a trailing edge of the wing and is mounted so as to tilt in a deployed downward position as the flap is deployed in a downward position. The rear fairing is positioned to enter a cold flow of the turbine engine, when deployed in the downward position. The rear fairing further supports at least one aerodynamic element that generates vortices that reduce, if not eliminates, vibrations to which the rear fairing is subjected.

8 Claims, 3 Drawing Sheets

PYLON FOR SUSPENDING A TURBOENGINE

The present invention relates to a suspension mast for a bypass turbine engine.

FIELD OF THE INVENTION

It is known that, on certain aircraft, particularly for civil transport, the suspension mast that provides the connection between a turbine engine and the corresponding wing is extended by a fairing at the rear of the trailing edge of said wing.

BACKGROUND OF THE RELATED ART

Such a rear fairing is designed either to enclose an actuator, for example for a flap, or to envelop a structural part of said mast.

Irrespective of its use, such a rear fairing is usually close to at least one flap, which means that it must be deployable like the latter.

However, in its deployed position (tilted downward), said rear fairing frequently partly enters the cold flow of the turbine engine. The result of this is that, particularly when the thrust of the turbine engine is high and the speed of the aircraft is low, the cold flow (the speed of which is high and may even be supersonic) generates vibrations in said rear fairing, said vibrations being able to seriously damage the structure of the latter.

It will be noted that predicting the vibration level of the mast rear fairing, when it is deployed and immersed in the flow close to the engine, can currently be done only with great difficulty with the design tools available. The discovery of such a problem therefore occurs during the flight tests of the aircraft, that is to say very late in the aircraft development cycle.

In order to solve this problem, the prior art consists in:
 not eliminating the vibrations, but reinforcing the structure of the rear fairing so that it withstands the vibrations. This solution leads to an increase in the weight of the aircraft, which is prejudicial to fuel consumption; and/or
 redefining the aerodynamic shape of the rear fairing, which is:
  industrially costly and potentially causes a delay in the program to bring the aircraft into service, because it is necessary to redefine the tools for manufacturing the rear fairing at a very advanced stage of the development of the aircraft, and
  usually a source of increased drag (and therefore fuel consumption) at cruising speed, because this change of shape leads to departing from the optimum which had initially been identified.

SUMMARY OF THE INVENTION

The object of the present invention is to eliminate, or at the very least reduce, said vibrations of the rear fairing by remedying the aforementioned disadvantages.

For this purpose, according to the invention, the mast for the suspension of a bypass turbine engine beneath a wing of an aircraft, said wing being furnished with at least one flap and said mast comprising a rear fairing which protrudes rearward relative to a trailing edge of said wing and which is mounted so as to tilt in a deployed downward position as said flap is deployed in a downward position, said rear fairing entering a cold flow of said turbine engine when in the deployed position, and is subjected to vibrations, is noteworthy in that said rear fairing supports at least one aerodynamic element that generates vortices that reduce, if not eliminate, said vibrations.

Therefore, by virtue of the present invention, the vortices, which are generated by said aerodynamic element and are very high-energy because of the high speed of the cold flow, act on the limit layer of said rear fairing and make it possible to reduce and/or eliminate the instationary phenomena which are normally exerted on the latter and which generate said vibrations capable of damaging said rear fairing.

Preferably, said rear fairing supports two aerodynamic elements that generate vortices, said elements being placed laterally, on either side of said rear fairing. Therefore, if these two elements do not completely neutralize said instationary phenomena, the latter may be confined to the upper portion of said rear fairing.

Each aerodynamic element that generates vortices may have the shape of an elongated fin, preferably provided with a beveled leading edge.

In order not to generate drag when the rear fairing and the flaps are retracted, said fin is therefore at least approximately aligned with the local aerodynamic flow. On the other hand, in order to generate the vortices that neutralize instationary phenomena, said fin forms, with said cold flow, an angle of at least 10 degrees, preferably ranging between 10 and 30 degrees, when said rear fairing is in the deployed position.

BRIEF DESCRIPTION OF THE DRAWINGS

The figures of the appended drawing will clearly explain how the invention may be embodied. In these figures, identical reference numbers indicate similar elements.

DETAILED DESCRIPTION OF THE INVENTION

Figure 1:
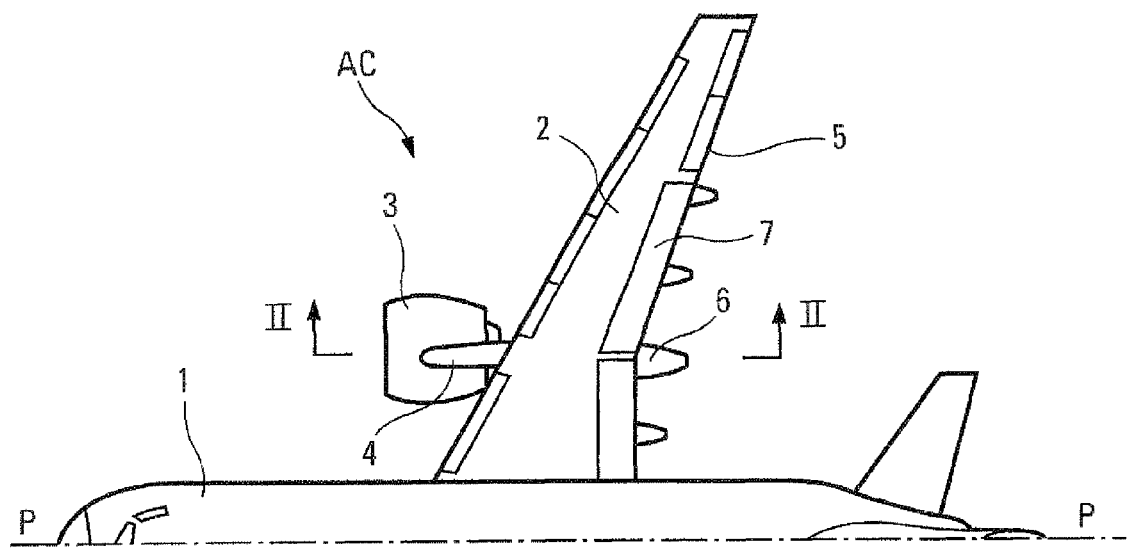
FIG. 1 shows schematically, in plan view, the right half of an aircraft to which the present invention may be applied. The left half of said aircraft, not shown in FIG. 1, is naturally symmetrical with said right half with respect to the longitudinal midplane P-P of said aircraft.

The aircraft AC shown schematically and partially in FIG. 1 comprises a fuselage 1 and wings 2. Bypass turbojets 3 are suspended beneath the wings 2, each by means of a suspension mast 4 extended downstream, beyond the trailing edge 5 of the wings 2, by a protruding rear fairing 6. In addition, the trailing edge 5 is provided with at least one moveable flap 7.

Figure 2:
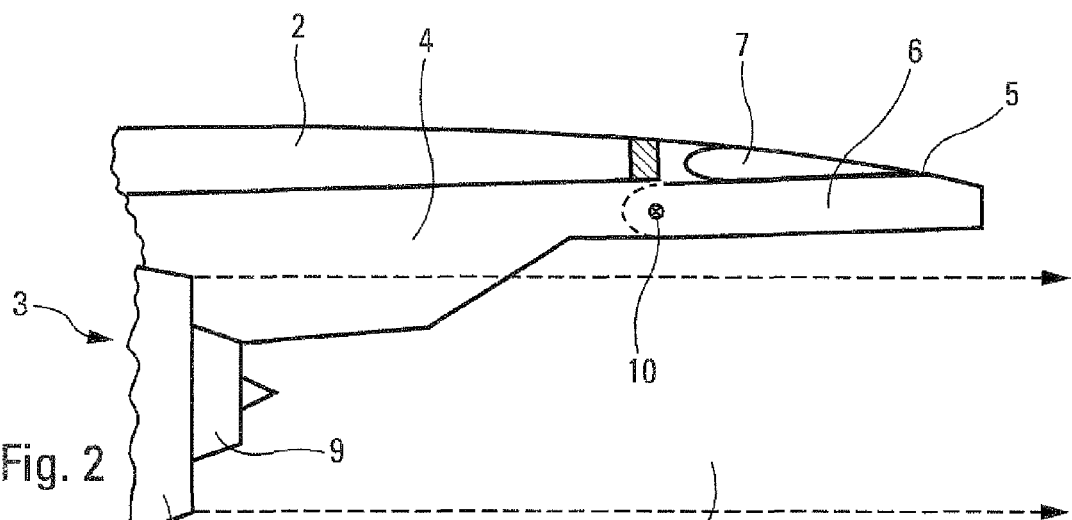
FIG. 2 is a schematic and enlarged partial section, along the line II-II of FIG. 1. It shows the rear portion of the mast for suspending a bypass turbine engine from a wing, the flap of the latter and the rear fairing of said mast being in the retracted position corresponding, for example, to cruising flight.
Figure 3:
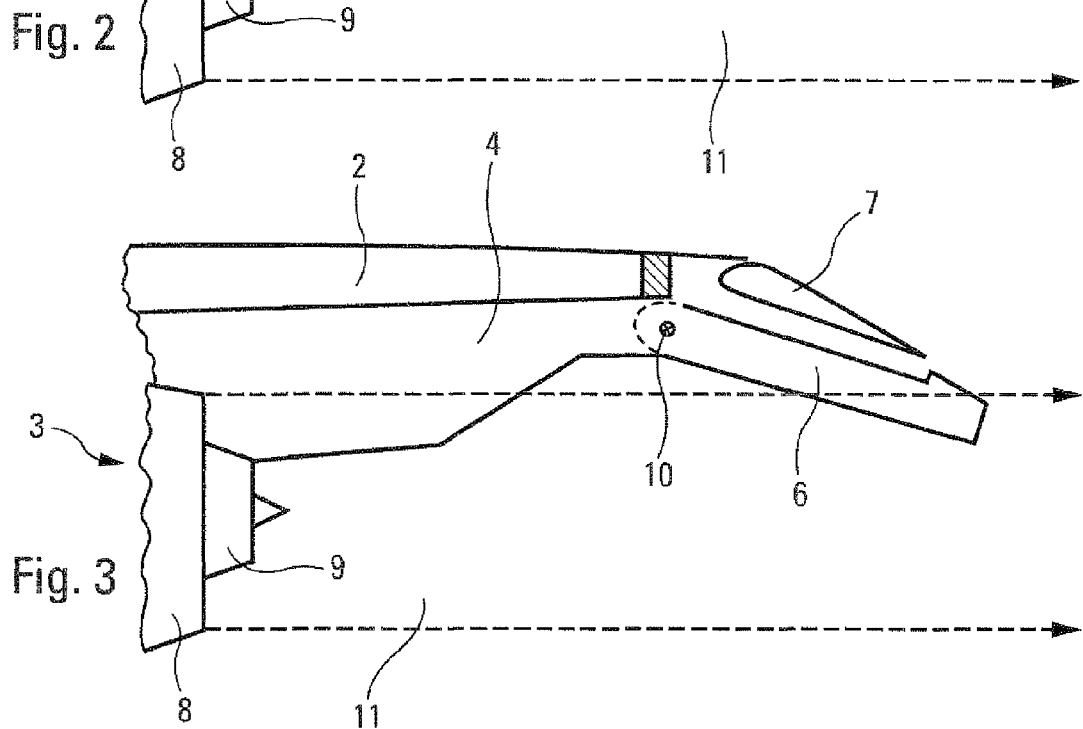
FIG. 3 is similar to FIG. 2, except that said flap and said rear fairing are then in the deployed position, corresponding, for example, to a take off or a landing phase.

As shown in FIGS. 2 and 3, the mast 4 is secured to the cold flow nozzle 8 and the hot flow nozzle 9 of the engine 3. In addition, these figures show, on the one hand, that the rear fairing 6 is articulated about an axis 10 parallel to the trailing edge 5, so as to be able to tilt downward when the flap 7 is deployed (see FIG. 3) and, on the other hand, that, in the downward-tilted position, said protruding fairing 6 enters the cold flow 11 generated by the nozzle 8.

Figure 4:
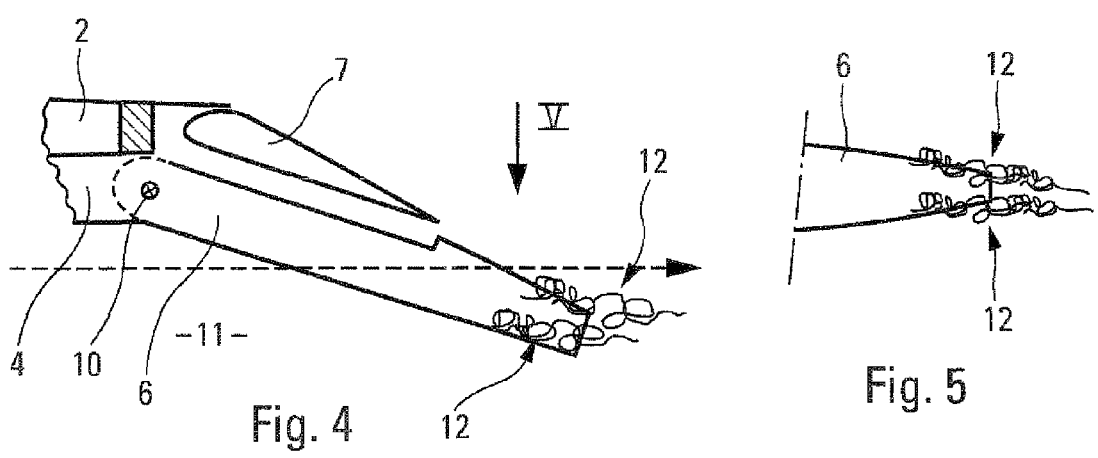
FIG. 4, which corresponds to the enlarged rear portion of FIG. 3, illustrates the formation of instationary phenomena located on said rear fairing, when the latter enters the cold flow of the corresponding turbine engine.
Figure 5:
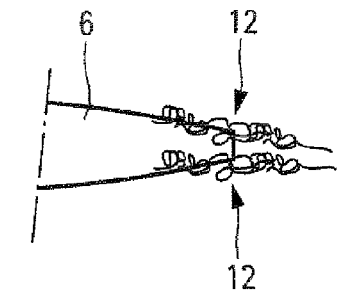
FIG. 5 is a top view, in the direction of the arrow V of FIG. 4, of the rear fairing in the deployed position, this figure also illustrating the formation of said instationary phenomena.

Because of this, for certain conditions of powerful thrust of the turbine engine 3 and of the low speed of the aircraft AC, the aerodynamic flow behind the rear fairing 6 may separate from the latter, generating instationary phenomena located on the lateral and/or upper portions of said rear fairing and represented schematically by the curly lines bearing reference number 12 in FIGS. 4 and 5. Such instationary phenomena generate vibrations in said rear fairing 6, which may damage the latter.

Figure 6:
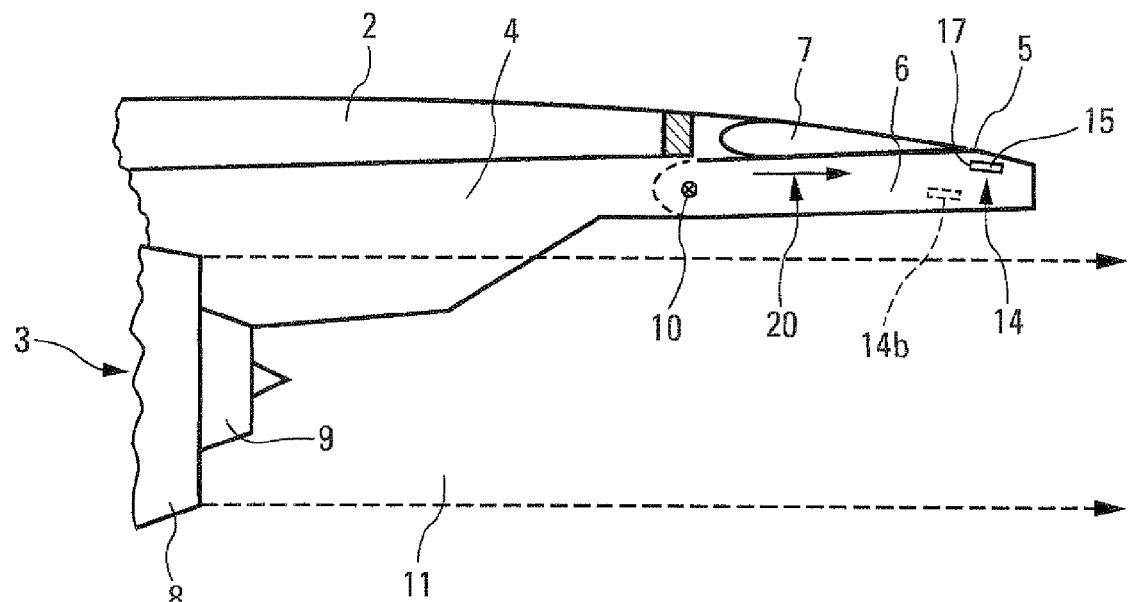
FIG. 6 illustrates, in a view similar to FIG. 2, the rear of said suspension mast the rear fairing of which is enhanced according to the present invention.
Figure 8:
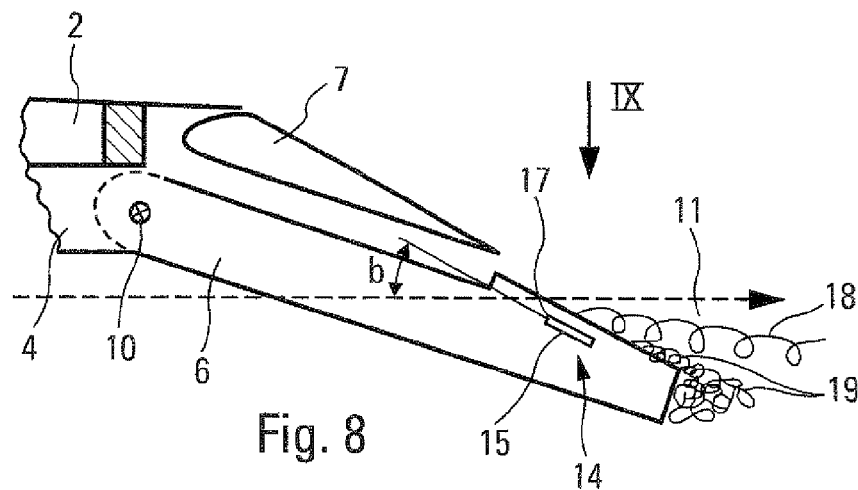
FIG. 8 illustrates, in a view similar to FIG. 4, the formation of vortices by vortex generators placed laterally on said rear fairing of FIG. 6, said vortices neutralizing said instationary phenomena.
Figure 9:
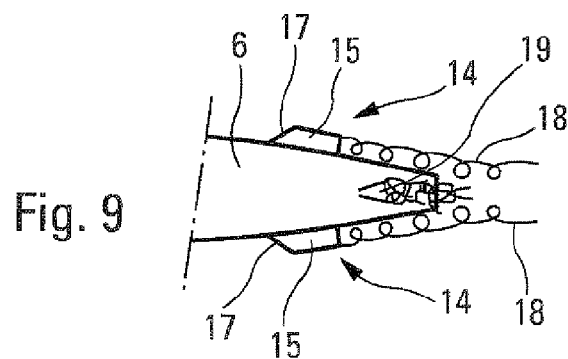
FIG. 9 is a plan view, in the direction of the arrow IX of FIG. 8, of said rear fairing provided with said lateral vortex generators.

To remedy this disadvantage, as shown in FIGS. 6, 8 and 9, at least one aerodynamic element 14 that generates vortices is mounted on said rear fairing 6, according to the present invention.

Figure 7:
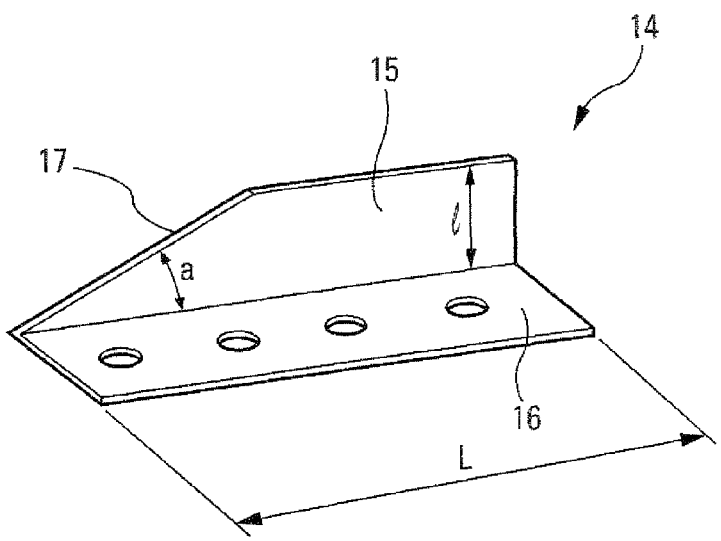
FIG. 7 shows, in perspective, a generator of vortices making it possible to enhance the rear fairing of FIG. 6.

The aerodynamic element 14, shown in FIG. 7, has the shape of a bracket comprising an elongated fin 15, secured to a plate 16 designed for the latter to be attached to said rear fairing 6, so that said fin protrudes relative to the latter.

The width of the fin 15 (which corresponds to the protrusion relative to the rear fairing 6) may be of the order of a few centimeters to a few decimeters. Preferably, the length L of said fin 15 is at least equal to three times the width l. The leading edge 17 of the fin 15 is preferably beveled, with the fin 15 having a length L, and the leading edge 17 extending at an angle a from the plate 16, preferably the angle a being less than 90°, but greater than 20°.

In the exemplary embodiment of FIGS. 6, 8 and 9, the rear fairing 6 supports two aerodynamic elements 14 which generate vortices, supported laterally on either side of said fairing. The very high-energy vortices generated by these two aerodynamic elements 14 and illustrated by the curly lines 18 make it possible to confine the zone of separation 19, possibly not entirely eliminated, on the top of the fairing 6.

When the rear fairing 6 is deployed (FIG. 8), the angle b between the fin 15 and the direction of the cold flow 11 advantageously ranges between 10 and 30 degrees. On the other hand, when the rear fairing 6 is retracted (FIG. 6), the fin 15 is practically in line with the local aerodynamic flow 20.

FIGS. 6 and 8 represent the aerodynamic elements 14 in a fairly high position relative to said rear fairing 6. However, these elements could occupy a lower position, as shown at 14b in FIG. 6.

The invention claimed is:

1. A mast for the suspension of a bypass turbine engine beneath a wing of an aircraft, said wing being furnished with at least one flap and said mast comprising a rear fairing which protrudes rearward relative to a trailing edge of said wing and which is mounted so as to tilt in a deployed downward position as said flap is deployed in a downward position, said rear fairing entering a cold flow of said turbine engine when in the deployed position, and is subjected to vibrations, wherein said rear fairing supports at least one aerodynamic element that generates vortices that reduce said vibrations.

2. The mast as claimed in claim 1, wherein said rear fairing supports two aerodynamic elements that generate vortices, said elements being placed laterally on either side of said rear fairing.

3. The mast as claimed in claim 1, wherein each aerodynamic element that generates vortices has a shape of an elongated fin.

4. The mast as claimed in claim 3, wherein said fin is provided with a beveled leading edge.

5. The mast as claimed in claim 4, wherein said leading edge forms, with a direction parallel to a length of said fin, an angle at least equal to 20 degrees.

6. The mast as claimed in claim 3, wherein, in a retracted position of said rear fairing, said fin is at least approximately aligned with the local aerodynamic flow.

7. The mast as claimed in claim 3, wherein, in the deployed position of said rear fairing, said fin forms an angle of at least 10 degrees with said cold flow.

8. The mast as claimed in claim 7, wherein, in the deployed position of said rear fairing, said fin forms, with said cold flow, an angle ranging between 10 and 30 degrees.

* * * * *